(12) United States Patent
DeCecca et al.

(10) Patent No.: US 6,185,372 B1
(45) Date of Patent: Feb. 6, 2001

(54) CAMERA WIND AND TRIP TESTING METHODS AND APPARATUS

(75) Inventors: Michael L. DeCecca, Fairport; Joseph A. Watkins; Mark D. Garlock, both of Rochester, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/577,079

(22) Filed: May 23, 2000

Related U.S. Application Data

(63) Continuation-in-part of application No. 08/956,997, filed on Oct. 23, 1997, now Pat. No. 6,088,528.

(51) Int. Cl.[7] ............................ G03B 17/02; G03B 17/48; G03B 15/00
(52) U.S. Cl. .............................. 396/6; 396/388; 396/419; 396/429; 396/661
(58) Field of Search ............................ 396/6, 401, 387, 396/388, 419, 429; 73/1.56

(56) References Cited

U.S. PATENT DOCUMENTS

| | | | |
|---|---|---|---|
| 3,003,229 | 10/1961 | Powell et al. | 73/1.56 |
| 3,253,797 | 5/1966 | Peterson | 396/401 |
| 3,899,245 | 8/1975 | Bernhardt | 396/431 |
| 3,913,376 | 10/1975 | Scott | 73/1.56 |
| 4,096,732 | 6/1978 | Springer | 73/1.56 |
| 4,325,620 | 4/1982 | Holley | 396/180 |
| 4,332,448 | 6/1982 | Zawodny | 396/396 |
| 4,903,055 | 2/1990 | Lourette et al. | 396/208 |
| 5,136,317 | 8/1992 | Goto et al. | 396/210 |
| 5,502,526 | 3/1996 | Katano | 396/535 |
| 5,502,529 | 3/1996 | Zander | 396/6 |
| 5,506,646 | 4/1996 | Dunsmore et al. | 396/157 |
| 5,649,258 | 7/1997 | Berstrasser et al. | 396/429 |

FOREIGN PATENT DOCUMENTS

| | | |
|---|---|---|
| 0 733 936 A1 | 9/1996 | (EP) . |
| 61-284753 | 12/1986 | (JP) . |
| 3-83048 | 4/1991 | (JP) . |
| 5-323517 | 12/1993 | (JP) . |
| 7-13279 | 1/1995 | (JP) . |
| 8-286224 | 11/1996 | (JP) . |

*Primary Examiner*—Eddie C. Lee
(74) *Attorney, Agent, or Firm*—Robert Luke Walker

(57) ABSTRACT

Method and apparatus for testing wind and trip in camera units for use with photographic film. Each camera unit encloses and defines a film path and includes a film driven preset member and a film spindle. The preset member extends into the film path. In the method, the film spindle of the camera unit is wound; and, in tandem with the winding, a film surrogate is propelled along the film path from a position upstream from the preset member to a position downstream from the preset member. During the propelling, the film surrogate is maintained in the film path.

20 Claims, 12 Drawing Sheets

CAMERA WIND AND TRIP TESTING METHODS AND APPARATUS

CROSS-REFERENCE TO RELATED APPLICATIONS

This is a continuation-in-part of application Ser. No. 08/956,997, filed Oct. 23, 1997, now U.S. Pat. No. 6,088,528, entitled: CAMERA WIND AND TRIP TESTING METHODS AND APPARATUS, by Michael L. DeCecca, Joseph A. Watkins, and Mark D. Garlock.

FIELD OF THE INVENTION

The invention relates to photographic film cameras and related manufacturing and testing equipment and methods, and more particularly relates to camera wind and trip testing methods and apparatus.

BACKGROUND OF THE INVENTION

During photographic film camera manufacturing, it is common practice to test the operation of film advance, metering, and shutter mechanisms. With some cameras, each of these mechanisms can be tested by use of externally accessible camera features without film in the camera. This is often referred to as "dry-firing" the camera. U.S. Pat. No. 5,649,258 describes automated test equipment usable with an example of this type of camera. Other photographic film cameras cannot be dry fired because film winding and shutter mechanism setting must be accompanied by movement of a film driven preset member of the camera unit.

The term "camera unit" is used herein to refer to a completely or incompletely assembled camera. The term "preset member" is used herein to refer generically to a part of the camera that extends into the film plane and must be moved to meter from one film frame to the next. The preset member is positioned in alignment with film perforations and, during use, the preset member moves as the film advances and the perforations are pulled past the preset member. The preset member either by itself, or as part of a larger mechanism, meters the film during film advance, that is, limits film advancing so as to cause an appropriately sized and positioned frame of film to register with the exposure frame of the camera. Since the preset member contacts the film during metering, the configuration of preset member is largely dependent upon the number and type of perforations in the film and the motion of the preset member during film advance. Some cameras have preset members that are pawls having one or more teeth. The pawl pivots or retracts during film advance to allow the film to pass and then moves into the appropriate perforation as the film is metered. In some cases, the preset member acts indirectly by locking or unlocking a shutter mechanism. In other cases, the preset member must be moved to set or preactuate the shutter mechanism. An example of the latter is a sprocket that must be rotated to cock a shutter mechanism. With 35 mm film, the preset member is typically a rotatable sprocket wheel having multiple teeth, uniformly spaced apart in the same manner as the film perforations. The sprocket wheel is typically rotated once per film frame advance. APS film has two perforations per frame. Some APS film cameras have a sprocket wheel with 4 appropriately spaced teeth that rotates once per two frames of film advance. Other sprocket wheels, with one or more teeth, vary in a similar manner.

The inability to dry-fire cameras having film driven preset members has been viewed as a shortcoming from the viewpoint of in-store demonstrations of camera features and some cameras have been sold with "dummy" film cassettes that include a length of non-processable film, to permit repeated dry firing. U.S. Pat. No. 3,253,797 teaches a dummy Type 126 film cassette, in which non-processable film is advanced from one chamber to another of the dummy cassette to demonstrate camera operation. After the demonstration, the camera film advance mechanism is retracted and a spring within the dummy cassette automatically rewinds the non-processable film. U.S. Pat. No. 5,136,317 teaches a dummy 35 mm cassette used, not for dry firing; but rather magnetic head cleaning. U.S. Pat. No. 4,325,620 discloses use of a test cassette having a graduated non-processable filmstrip. These approaches have the shortcoming that the non-processable film is curled about the take-up spool and advance mechanism or spindle of the camera during the "dummy" operation, demonstrating, testing, or cleaning. The non-processable film must be rewound off the advance mechanism at the end of the dummy operation. This step takes time and, in manufacturing, might require additional equipment. Both increase manufacturing costs.

U.S. Pat. No. 3,899,245 discloses a testing device for cinematographic cameras, in which a test cassette has a loop of film bearing test images. A fiber optic cable extending through holes in the camera and cassette projects light through the film and lens to a screen.

In-store dry firing is not an issue for one-time use cameras, since they are sold preloaded with film; however, camera film advance and metering mechanism testing (also referred to herein as "wind" testing) and camera shutter mechanism testing (also referred to herein as "trip" testing) are commonly performed on one-time use cameras using 35 mm film or the like, by initially loading film with a portion of the trailer in the exposure frame of the camera. (One-time use cameras are commonly loaded with prewound film, which is then advanced back into the film cassette.) The shutter trigger is then tripped and the film is advanced to test the camera. Since the frame of film used for testing is part of the trailer, all regular film frames remain available to the user. This procedure is described in columns 1–2 of published European Patent Application EP 0 733 936 A1.

Reusable cameras using APS films can provide drop-in loading since the film is fully retained in the film canister and there is no leader to position during film loading. A lengthy leader is unnecessary and is not provided. This presents a problem for APS one-time use cameras. Wind and trip testing of a portion of the film in an APS one-time use camera would reduce the number of exposures available to the user. European Patent Application EP 0 733 936 A1 describes approaches to this problem. The shutter is charged by an appliance that is extended into the camera through a slot or is set by rotating a winding wheel that moves the film and sets the shutter independently of the film perforations. In both cases, the film is not advanced beyond a trailer portion of the film and the test exposure does not reduce the number of film frames available to the user. These approaches have the shortcomings that metering is not tested, and the operation of film advance and shutter mechanisms is tested in a different manner than the camera will be used. Japanese Patent Application publication JP 5-323517, filed Dec. 7, 1993, describes another approach. A shutter mechanism is set, before assembly with the remainder of a camera unit and film loading. This approach allows shutter testing, without film advance or metering. Japanese Patent Application Publication JP 7-13279, filed Jun. 23, 1993, describes a procedure for setting a shutter mechanism before assembly with the remainder of a camera unit. U.S. Pat. No. 3,003,229 describes a similar approach.

It would thus be desirable to provide camera wind and trip testing methods and apparatus for use with a camera unit including a film spindle and a film driven preset member, in which wind and trip can be tested without the use of a film cassette and without curling a non-processable strip about an advance mechanism.

SUMMARY OF THE INVENTION

The invention is defined by the claims. The invention, in its broader aspects, provides method and apparatus for testing wind and trip in camera units for use with photographic film. Each camera unit encloses and defines a film path and includes a film driven preset member and a film spindle. The preset member extends into the film path. In the method, the film spindle of the camera unit is wound; and, in tandem with the winding, a film surrogate is propelled along the film path from a position upstream from the preset member to a position downstream from the preset member. During the propelling, the film surrogate is maintained in the film path.

It is an advantageous effect of at least some of the embodiments of the invention that camera wind and trip testing methods and apparatus for use with a camera unit including a film spindle and a film driven preset member are provided, in which wind and trip are tested without the use of a film cassette and without curling a non-processable strip about a spindle.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
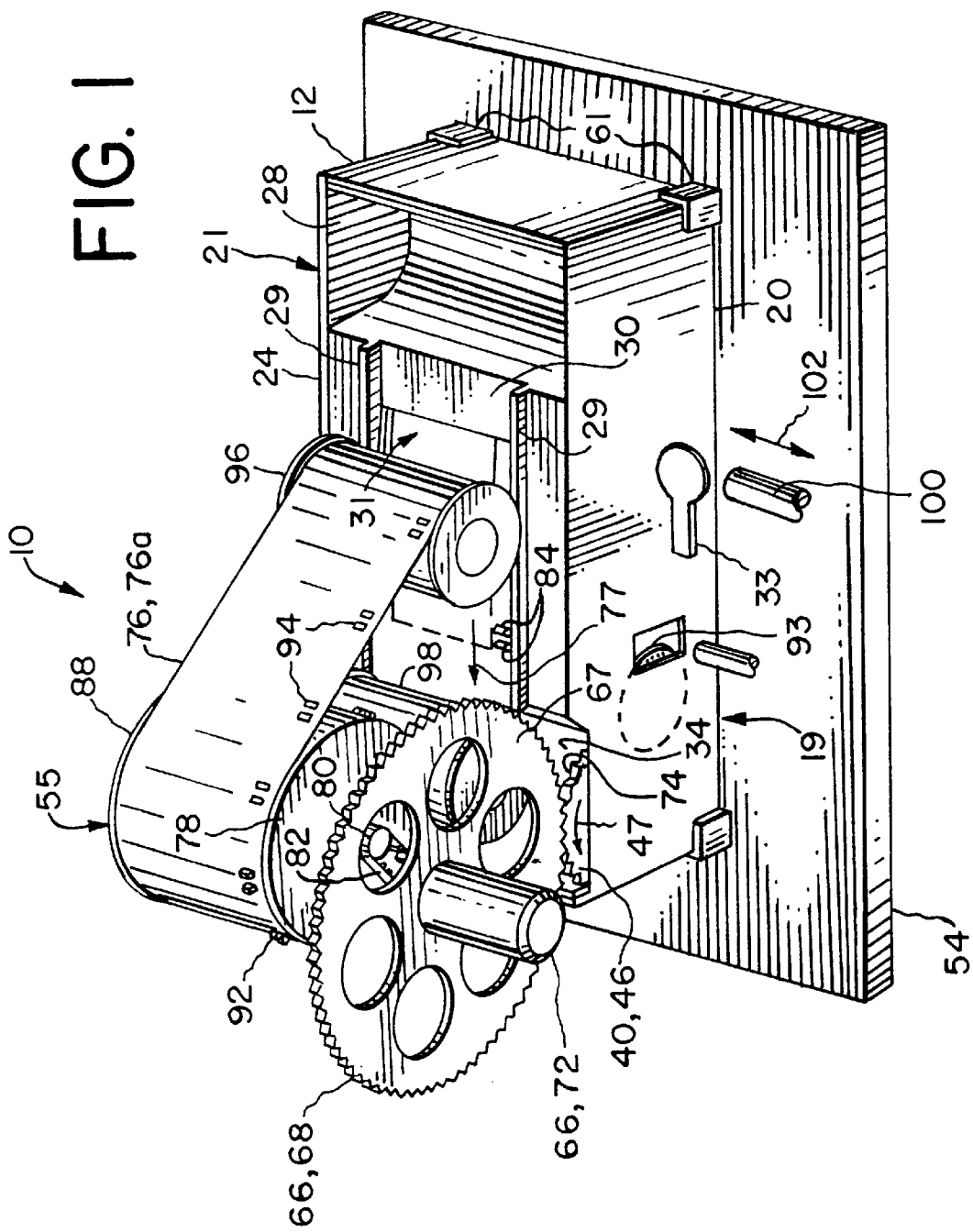
FIG. 1 is a perspective view of an embodiment of the apparatus of the invention, with a camera unit in place in the testing site. The film surrogate and spindle drive of the apparatus are each in an active conformation. For clarity, support structures of the apparatus are not shown. The locations of part of the counterwheel and part of the exposure frame are indicated by dashed lines.

Referring initially primarily to FIGS. 1–5A, in the apparatus 10 and method of the invention, the wind and trip functions of photographic film camera units 12 are tested. The method and apparatus 10 of the invention are suitable for both reusable and one-time use cameras, but are particularly convenient for testing one-time use cameras in which film 14 prewound into a roll 16 is advanced back into a film cartridge 18 during use, since a frame of film loaded in the camera is not consumed by wind and trip testing. The figures illustrate one embodiment of a one-time-use camera unit 12.

The camera units each have a front cover 20, a back cover 22, and a main body portion 24 located between covers 20,22. The main body portion 24 defines a film path 26 (indicated by a dashed line in FIG. 2) along which photographic film 14 travels as the film 14 is advanced during use. The film path 26 extends from a first film chamber 28, across an intermediate section 30 to a second film chamber 34. The intermediate section 30 includes an exposure area 31 to which light is directed by an exposure system 32 (indicated by a dashed line in FIG. 2). The exposure system 32 includes sub-components such as a baffle, a lens system, and a shutter (not separately illustrated) and a shutter release 33. The camera unit 12 can include a variety of other well-known camera features. For example, the intermediate section can include frame rails 29 for supporting the film 14 during camera use. Discrete camera constituents, such as, a viewfinder, a flash system, and a battery (not separately illustrated); can be installed in the camera unit 12 prior to testing or can be installed after testing is completed.

During camera use, the first film chamber 30 can contain a coreless film roll 16 (indicated by a dashed line in FIG. 2) or can have a film roll held by a spool (not illustrated). The second film chamber 34, during use, holds film 14 rolled on a spool 36 within the film cartridge 18 (both indicated by dashed lines in FIG. 2).

A spindle 40 is mounted to the main body portion 24 of the camera unit 12. The term "spindle" is used herein to refer collectively to parts of the camera unit including: an engagement portion 42 that grips the spool 36 in the second film chamber 34 for film advance during camera use, and a rotational portion 46 that is mechanically connected to the engagement portion 42 and is accessible by the spindle drive 66 (discussed below) for common rotation of the rotational and engagement portions 46,42. The spindle 40 is rotated in a first direction (indicated by arrow 47) for film advance and, preferably, includes an anti-reverse feature, such as a ratchet and pawl (not shown), to preclude rotation in the opposite direction. During use, the spindle 40 winds the film 14 onto the spool 36 and the film 14, in turn, operates a preset member 48 that is mounted to the main body portion 24. The preset member 48 extends outward from the main body portion 24 into the film path 26. During film metering, that is, advancement of the film 14 in the exposure area 31 from one film frame to the next; the preset member 48 is moved, by the film 14, from a non-metered position to a metered position. The movement of the preset member 48 also sets the shutter and can advance a film counter. Details of suitable camera mechanisms having these features are well-known to those of skill in the art. The method and apparatus of the invention can be used with camera mechanisms having gear driven or other non-film driven, preset members; but are not particularly advantageous for camera units having non-film driven preset members.

In the embodiments shown in the figures, the preset member 48 is a sprocket 44 having two pair of teeth, and the movement of the preset member 48 is a rotation or pivoting. The rotation of the engagement portion 42 of the spindle 40 during film advancement, and the pivoting or other movement of the preset member 48 during that advancement are proportional. Beyond this, specific details of the spindle 40 are not critical to the invention. Such details are commonly varied to meet the requirements of a particular camera.

In the one-time use cameras shown in the figures, the spindle 40 includes a shaft 50 and a thumbwheel 46 fixed to the shaft 50. The thumbwheel 46 is rotatably mounted to the main body portion 24 (not shown). The preset member is a sprocket that rotates about an axis parallel to a transverse dimension of the film path 26. The sprocket 48 rotates through 180 degrees when film 14 is wound from one film frame to the next. The sprocket 48 has two pair 49 of teeth. The leading and following teeth 51,53 of each pair 49 of teeth are spaced apart by a separation that is smaller than the separations between the pairs 49 of teeth. The sprocket 48 is spring-biased (not shown) to freely rotate through a pair of arcs corresponding to the separations between the pairs 49 of teeth. Each arc of spring-biased rotation begins, at a position shown in dashed line in FIG. 3, when a following tooth 53 exits the film path 26 and ends, at a position shown in solid line in FIG. 3) when the succeeding leading tooth 51 enters the film path 26. Between these arcs, the sprocket 48 is engaged by the metering system and does not freely rotate.

The apparatus 10 of the invention includes a receiver 54, and active components 56 (discussed in detail below). The receiver 54 supports a camera unit 12 in a predetermined testing site 58, such that features of the supported camera unit 12 are located in specific predetermined locations relative to the receiver 54. The receiver 54 can accept the camera unit 12 directly or can be adapted to accept a pallet 60 or the like. In that case, the camera unit 12 is held in a predetermined relation to the pallet 60, which in turn in held by the receiver 54. Indexing features can be provided on the receiver 54 or pallet 60 or both to permit registration of the camera unit 12 and receiver 54. The camera unit 12 can be provided to the receiver 54 premounted on a pallet 60 or the pallet 60 and camera unit 12 can be assembled on the receiver 54. The receiver 54 can have a variety of features for supporting automated assembly operations. For example, the receiver 54 can include a movement system or positioner (indicated by arrow 62 in FIG. 5), for moving a camera unit 12 between the apparatus 10 of the invention and one or more other assembly stations or between stations 62 having different components 56 of the apparatus 10 of the invention. The receiver 54 or pallet 60 can include indexing features 61 to permit the camera unit 12 and the receiver 54, or the receiver 54 and pallet 60, to be readily aligned.

Figure 2:
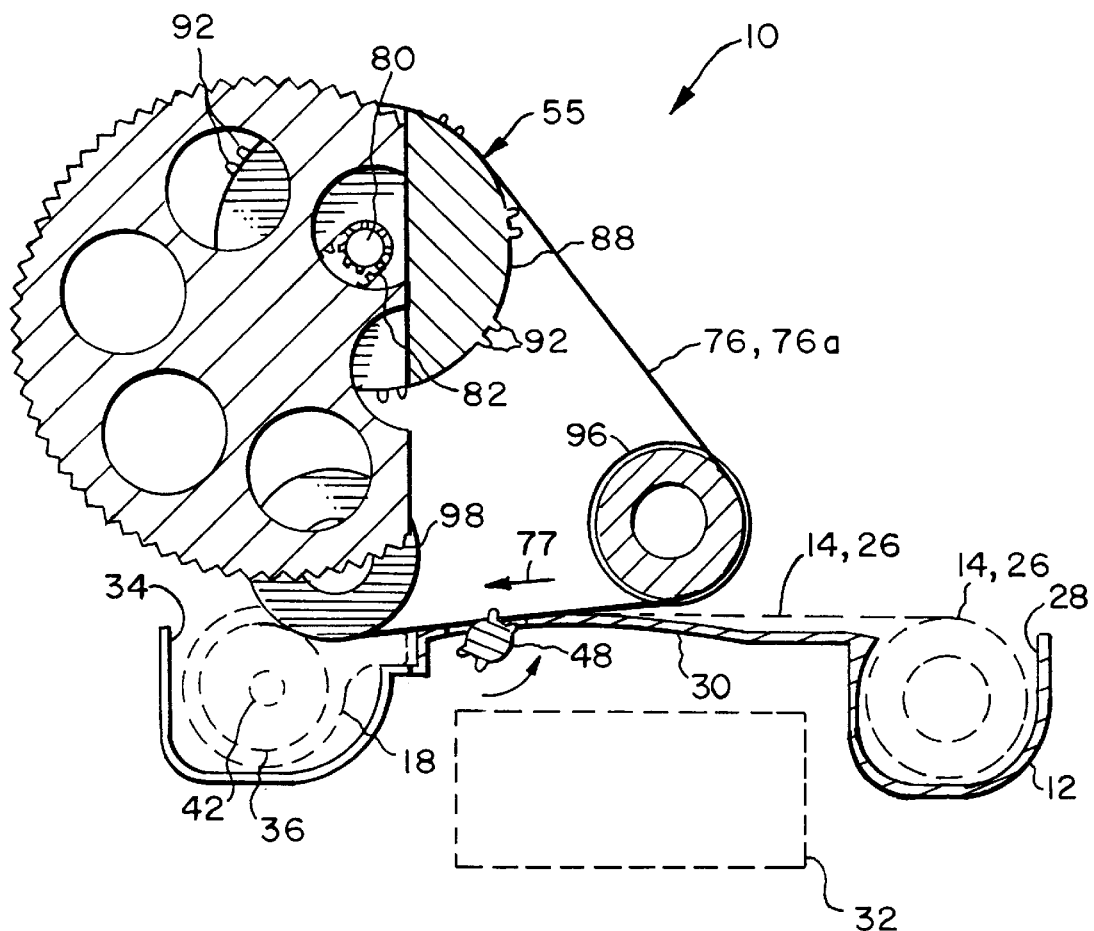
FIG. 2 is a semi-diagrammatical cross-sectional view of the apparatus and camera unit of FIG. 1. For clarity, parts of the apparatus and camera unit are not shown and the spindle drive and surrogate drive are each shown in separate partial cross-sections. The locations of a cassette, cassette spool, film path, film roll, and exposure system are indicated by dashed lines.
Figure 5:
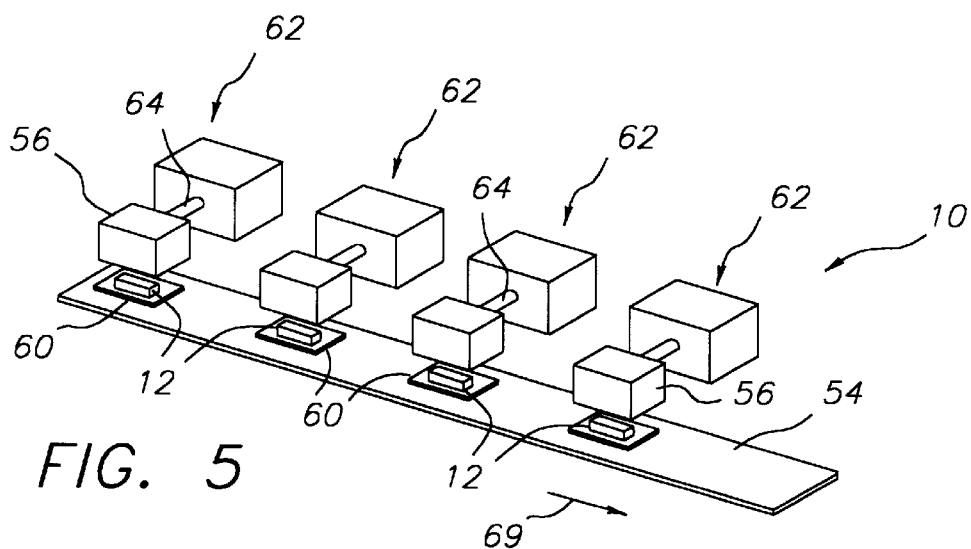
FIG. 5 is a semi-diagrammatical perspective view of another embodiment of the apparatus of the invention and a number of camera units.
Figure 5A:
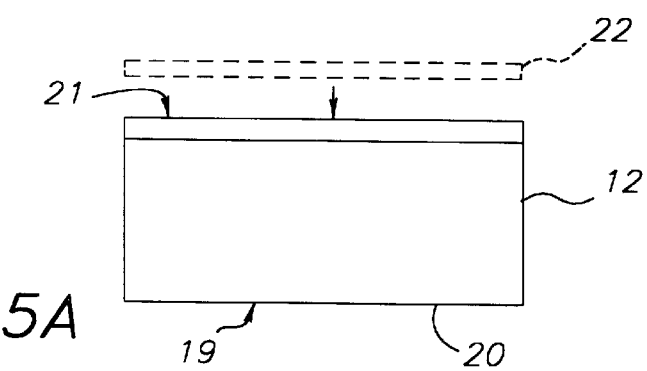
FIG. 5A is a semi-diagrammatical side view of the installation step of the method of the invention performed by the apparatus of FIG. 5. The back closure of the camera unit is shown before installation in dashed lines and after installation over the back of the main portion, in solid lines.

When on the receiver 54, the back 21 of the camera unit 12 is open and accessible to the apparatus 10 of the invention. In the embodiments shown in the figures, the back 21 of the camera unit is closed by a separate back cover 22 that is not attached to the camera unit 12 until wind and trip testing has been completed and film has been loaded in the camera unit 12 as shown in FIGS. 2 and 5A.

Figure 4:
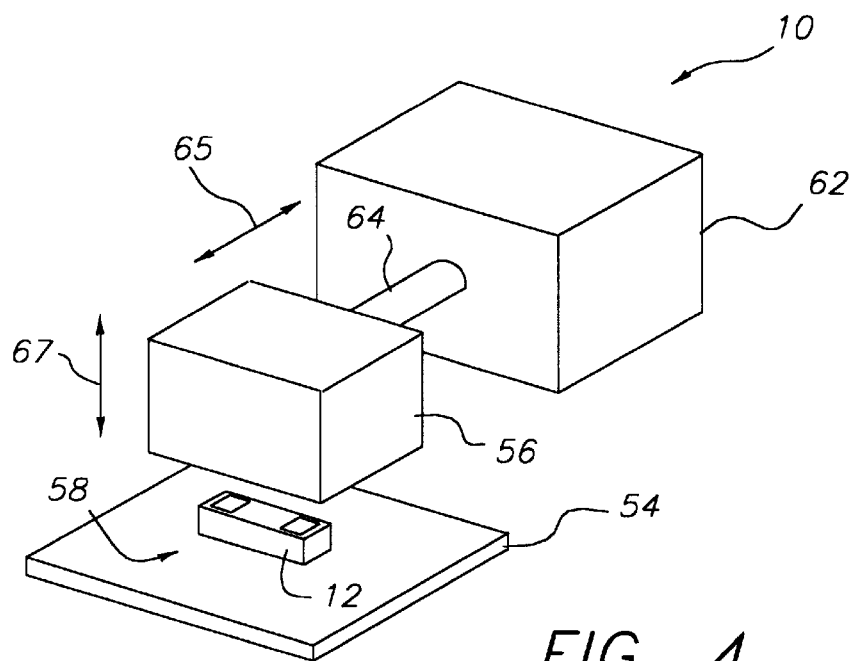
FIG. 4 is a semi-diagrammatical perspective view of the apparatus and camera unit of FIG. 1 showing the apparatus components in stored conformation.

The active components 56 can each include an actuation mechanism 64 such as a retraction-extension unit to allow the component 56 to extend to an active configuration for use and to retract to an inactive configuration clear of the receiver 54. (Examples of possible directions of movement for one component 56 are indicated in FIG. 4, by double-headed arrows 65,67.) Multiple components 56 can be provided at an individual station 62. As a matter of convenience, the following discussion generally treats the receiver 54 as being static relative to other components 56 of the apparatus 10 of the invention and treats subcomponents of apparatus components 56 as moving in unison between different configurations; but it will be understood that this is a simplification and that components and sub-components can be moved in a variety of ways to achieve the different configurations.

In the apparatus 10, one of the components 56 is a wind and trip unit 55 that includes a spindle drive 66 having a cyclically movable drive member 68. The wind and trip unit 55 is discussed herein as being movable as a single piece, between active and inactive configurations. This is a matter of convenience. The subcomponents of the wind and trip unit 55 discussed below, can move together or separately, as desired.

When the wind and trip unit 55 is disposed in the active configuration, the drive member 68 of the spindle drive 66 mechanically couples to the rotational portion 46 of the spindle 40 of the supported camera unit 12 so as to cause the spindle 40 to rotate with the cyclic movement of the drive member 68. In the inactive configuration of the wind and trip unit, the spindle drive 66 is pulled back from the spindle 40 and receiver 54. Detailed features of the spindle drive 66 depend upon the features of the spindle 40 of the camera unit 12 with which the apparatus 10 is to be used.

If the engagement portion 46 of the spindle 40 is an accessible thumbwheel as in the camera units 12 shown in the figures, then a convenient spindle drive 66 has a drive member 68 in the form of a disk that rotates, in the direction indicated by arrow 67, about a shaft 72 mounted to a support member (not shown). The disk 68 engages the rim 74 of the thumbwheel 46. The disk 68 can be toothed complementary to the thumbwheel 46 or knurled or otherwise configured to provide a positive engagement with the thumbwheel 46. The spindle drive 66 is not limited to rotational motion nor to driving a thumbwheel 46. For example, the drive member 68 can reciprocate against an advance lever of a camera unit (not shown) to rotate the advance lever through one or more arcs. The drive member 68 can also couple directly to the shaft 50 of a spindle 40 (not shown) such that the shaft includes both rotational and engagement portions 46,42.

Another subcomponent of the wind and trip unit 55 is a film surrogate 76. The film surrogate 76 is disposed in the film path 26 when the film surrogate 76 is in the active configuration and is spaced apart from the film path 26 when the film surrogate 76 is in the inactive configuration. The film surrogate 76 is propelled along the film path 26; in FIGS. 1–3, in the direction indicated by arrow 77; from a position upstream of the preset member 48 to a position downstream from the preset member 48, by a surrogate drive 78 which drives the film surrogate 76. For convenience, this movement of the film surrogate 76 is referred to as the "test motion". The terms "upstream" and "downstream" refer to positions relative to the normal direction of film advance in the camera unit 12. "Upstream" is contrary to the direction of film advance. "Downstream" is in the direction of film advance.

Figure 11:
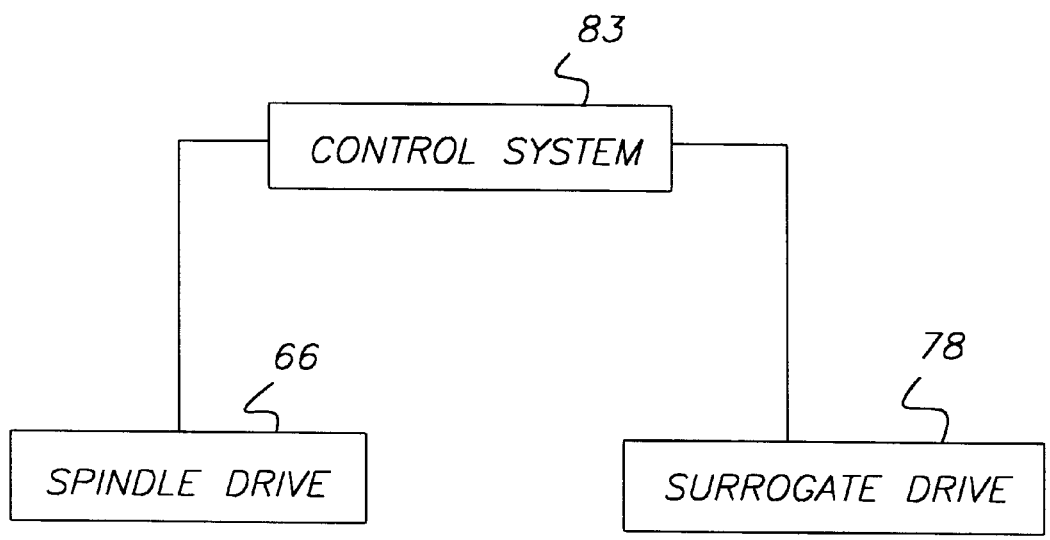
FIG. 11 is a diagrammatical view of coupling of the spindle drive and surrogate drive by a control system.

The test motion of the film surrogate 76 occurs in tandem with the cyclic movement of the drive member 68 of the spindle drive 66. For automated testing, it is highly desirable that the test motion of the film surrogate 76 and drive member 68 be synchronized, for example, by coupling the film surrogate 76 to the spindle drive 66. In the embodiment of the apparatus 10 shown in FIGS. 1 and 2, the shafts 72,80 of the spindle drive 66 and surrogate drive 78 are each toothed (not shown for shaft 80) and are mechanically coupled by a toothed belt 82. Other couplings, such as a gear train; can also be used. Referring now to FIG. 11, the spindle drive 66 and surrogate drive 78 can also be coupled by a control system 83; in which sensors detect the positions or relative states of the spindle drive and surrogate drive and operate motors of the spindle drive and surrogate drive through an electronic controller.

In moving along the film path 26, the film surrogate 76 closely replicates the action of a segment of film 14 advancing through the camera unit 12 during use. With a rotating preset member 48 such as a sprocket wheel, it is desirable that the film surrogate 76 be substantially planar. The planar shaped film surrogate 76 like the film 14, contacts and applies force against the preset member 48 over a limited area, which changes orientation and location as the preset member 48 rotates. Leverage is applied against the preset member 48 in the same manner as during actual use; and fit and finish of the preset member 48, related to wind and trip functions, are also tested.

The film surrogate 76 is maintained within the film path 26 during the test motion, from a position upstream from the preset member 48 to a position downstream from the preset member 48. The film surrogate 76 can be substantially rigid or flexible and can be self-positioning or can require a backer 86 to retain the film surrogate 76 in the film path 26 during the test motion. The film surrogate 76 can be pushed or pulled along the film path 26 during the test motion. If pushed, it is desirable that the film surrogate 76 be substantially rigid and that the film surrogate be substantially rigidly mounted to the surrogate drive 78; since otherwise there is a risk that the film surrogate will deform or deflect away rather than engaging the preset member.

In particular embodiments of the invention, the film surrogate 76 is substantially planar so that, during movement of the film surrogate 76 along the film path 26, engagement sections 84 of the film surrogate 76 contact about the same areas of the preset member 48 as would be contacted by a segment of film 14 during film advance. This replicates the leverage applied by the film against a pivotable preset member 48 during actual use and effectively tests fit and finish of the preset member 48. The engagement sections 84 are parts of the film surrogate 76 that contact the preset member 48 during the test motion of the film surrogate 76. The size and shape of the engagement sections 84 are preferably the same as areas of the film 14 that contact the preset member 48 during camera use.

The film surrogate 76 can ride on the film rails 29 during wind and trip testing, or can be interposed between or otherwise spaced apart from the film rails 29. A film surrogate 76 that rides on the film rails is located in the same place as the film 14 during camera use, but it is relatively more difficult to position the wind and trip unit 55 in the active configuration and there is a risk of wear or transfer of contaminants to the film rails 29. On the other hand, interpositioning or otherwise positioning the film surrogate 76 apart from the film rails 29 causes the film surrogate 76 to contact the preset member 48 at a slightly offset from the position of film during camera use. This makes for relatively easy placement of the wind and trip unit 55 in the active configuration and eliminates any possible wear or transfer of contaminants to the film rails 29 as a result of wind and trip testing.

The wind and trip unit 55 preferably includes an actuator 100 that is movable (as indicated by arrow 102) against and away from the shutter release 33 to trip the shutter (not separately illustrated) after the film surrogate 76 has been advanced by a winding interval corresponding to advancing film 14 in the completed camera to the next film frame. The advancement moves the preset member 48 from a non-metered position to a metered position and sets the shutter. The wind and trip unit 55 can also include a sensor that, in the active configuration, is positioned so as to confirm rotation of an exposure counter 93.

In FIG. 1, the film surrogate 76 is an substantially flexible, endless belt 76a. The film surrogate 76a has perforations 94 shaped and located on the film surrogate 76a in the same manner as the perforations between film frames of Advanced Photo System™ (APS™) film. The surrogate drive 78 has a motor (not separately illustrated) geared or otherwise mechanically connected, to an outer sheave 88 and the shaft 80. The sheave 88 has ears 92 positioned to fit in perforations 94 in the belt 76a. The belt 76a is looped over and tensioned against the sheave 88 and a pair of idler rollers 96,98. During test motion, the belt 76a is in the active configuration and is supported and retained in the film path 26 by the pair of idler rollers 96,98. In the active configuration, the belt 76a is positioned in the film path 26 with the first idler roller 96 upstream from the preset member 48 and the second idler roller 98 downstream from the preset member 48. The idler rollers 96,98 are preferably positioned sufficiently far apart so as to cause the belt 76a to be substantially planar where the belt 76a contacts the preset member 48. The separation of the idler rollers 96,98 is otherwise a matter of convenience. The idler rollers 96,98 in the active configuration are disposed slightly rearward (up in FIG. 2) and slightly forward (down in FIG. 2), respectively, relative to the film path 26 at the preset member 48. This ensures that the belt 76a is disposed in the film path 26 at the preset member 48 and that the idler rollers do not contact the camera unit 12 when the wind and trip unit 55 is moved into the active configuration, despite any minor mispositioning due to manufacturing tolerances.

Figure 3:
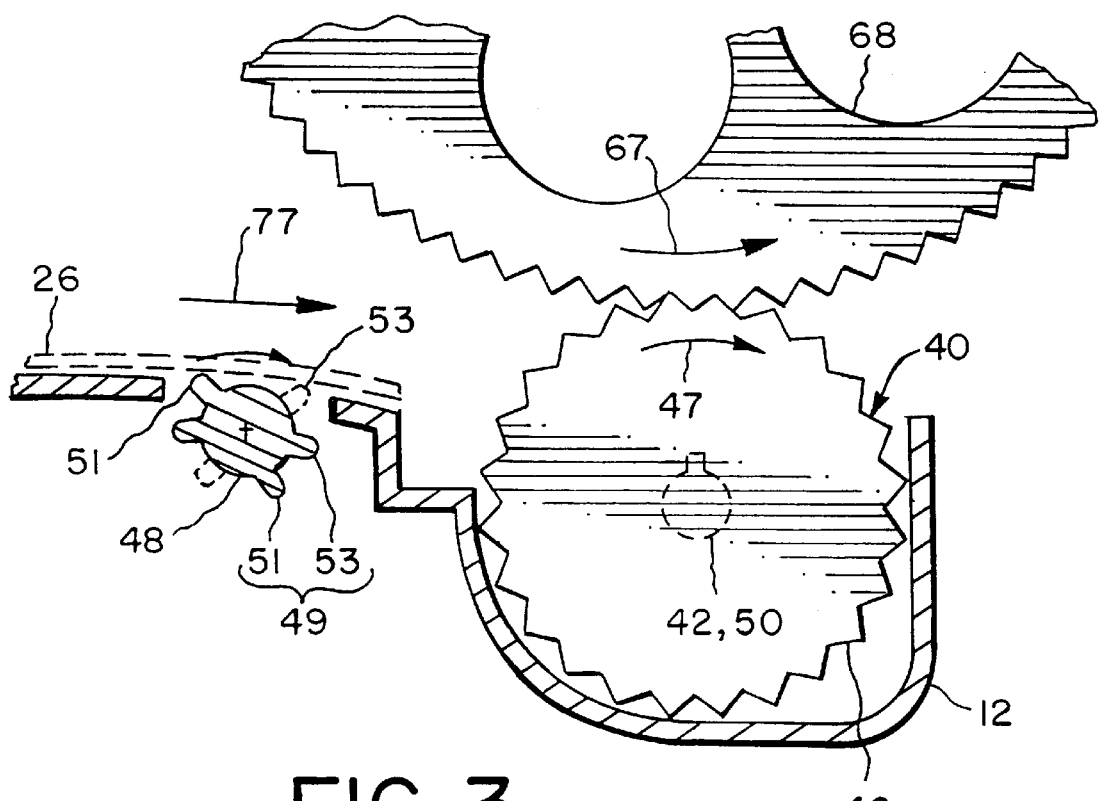
FIG. 3 is an enlarged partial cross-sectional view of the apparatus and camera unit of FIG. 1. For clarity, most components of the camera unit are deleted.

In use, a camera unit 12 is registered in the testing site 58 and the wind and trip unit 55 is moved to the active configuration. The back 22 of the camera unit 12 is open and remains open during the wind and trip testing. Following the wind and trip testing a back cover or other closure 22 is installed over the back 22 of the camera unit 12. In so doing, the film surrogate 76 is moved into the film path 26 adjoining the preset member 48 of the camera unit 12 and the spindle drive 66 is moved into engagement with the thumbwheel 46. The spindle drive 66 is rotated causing the spindle 40 to rotate. The surrogate drive 78 advances the film surrogate 76 in tandem with the rotating of the spindle 40, moving an engagement portion 42 of the film surrogate 76 up to, against, and past the preset member 48, actuating the preset member 48. Referring more specifically to FIGS. 1–3, the spindle drive 66 rotates the thumbwheel 46 and the engagement portion 42 of the spindle 40 to which the thumbwheel 46 is fixed. Simultaneously, the surrogate drive 78 winds the belt 76a to the next set of perforations 94 and pivots the preset member 48 from into a metered position for the next film frame.

The actuator 100 then presses the shutter release 33 tripping the shutter. The steps of winding the spindle 40, propelling the film surrogate 76 along the film path 26 to actuate the preset member 48 while maintaining the film surrogate 76 in the film path, and tripping the shutter can be repeated as desired for the camera unit 12 registered in the testing site 58 and those steps are repeated for succeeding camera units 12.

Figure 6:
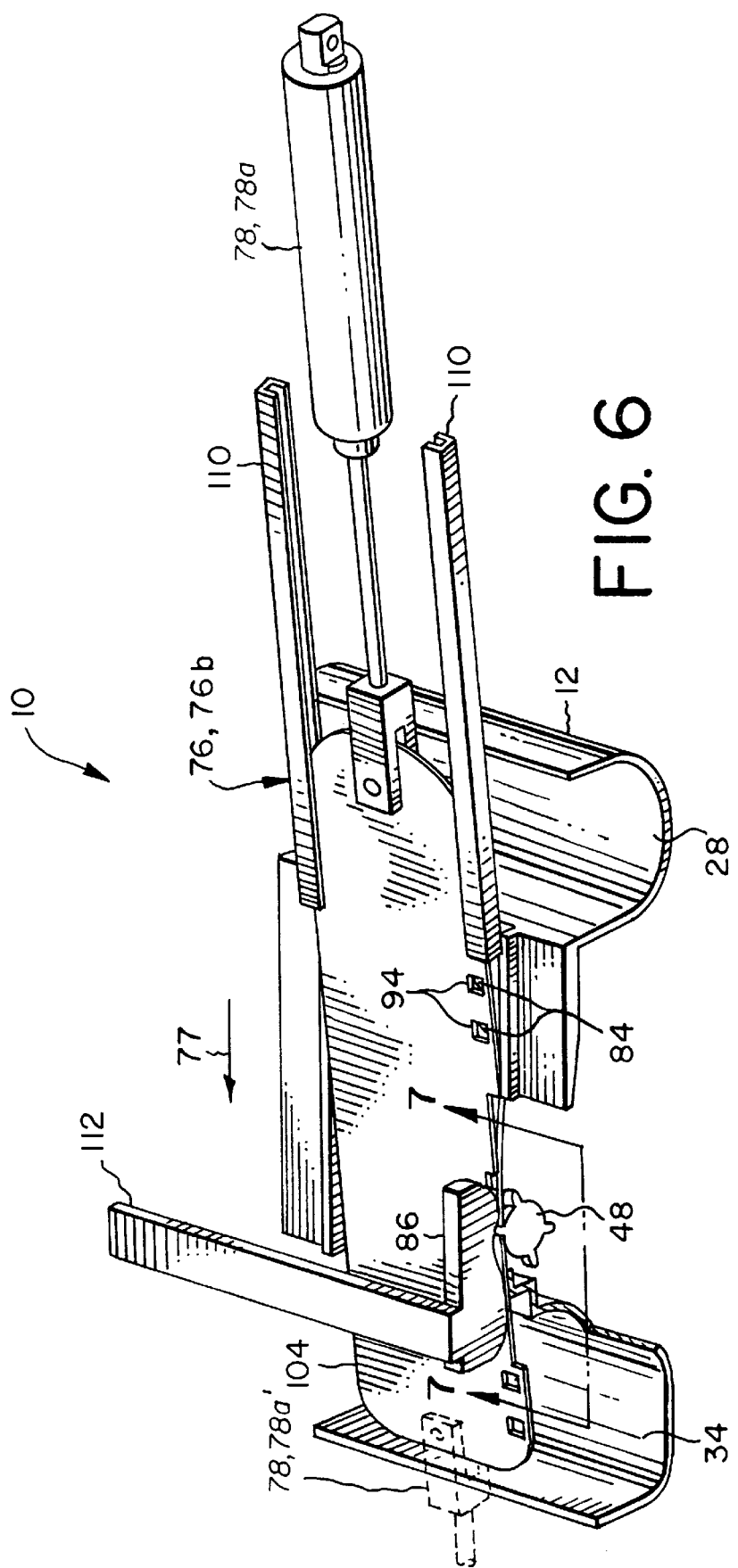
FIG. 6 is a perspective view of still another embodiment of the apparatus of the invention and a camera unit. The film surrogate and backer of the apparatus are each in an active conformation. For clarity, the spindle drive and other parts of the apparatus and camera unit are not shown and part of the camera unit is cut-away. An alternative location for the film surrogate arm is shown in dashed lines.
Figure 7:
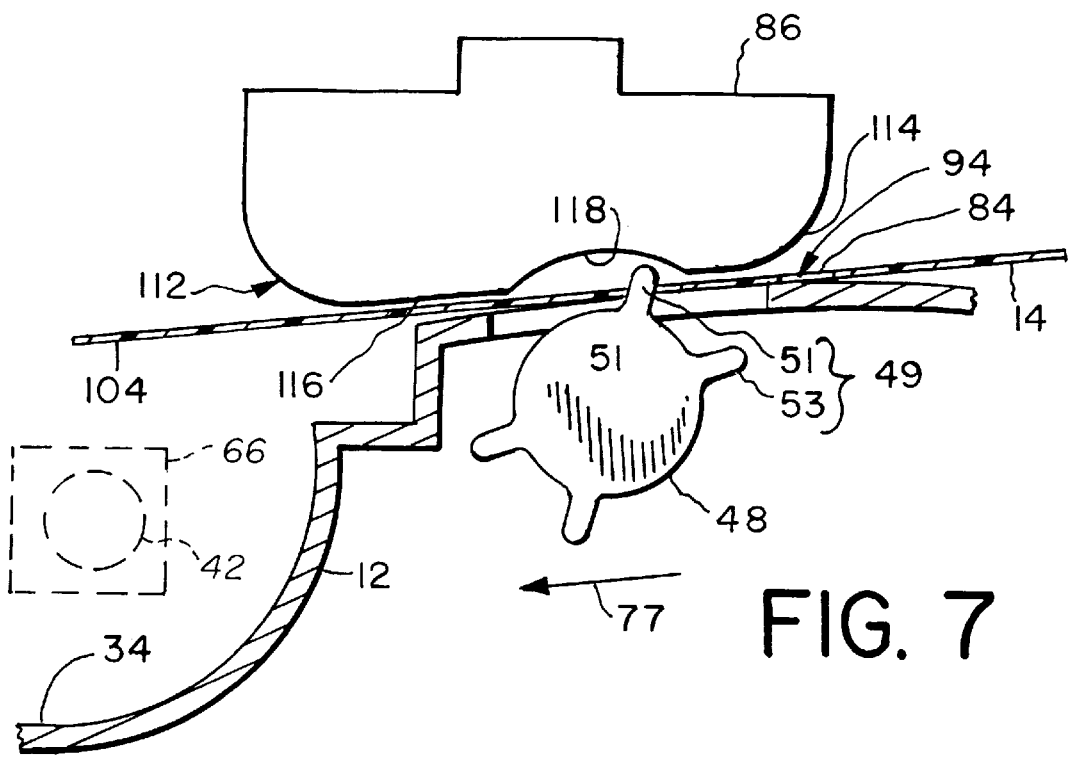
FIG. 7 is an enlarged partial cross-sectional view of the apparatus and camera unit of FIG. 6 taken substantially along lines 7—7. The spindle and spindle drive are illustrated diagrammatically by dashed lines.

Referring now to FIGS. 6–7, in another embodiment of the invention, the film surrogate 76 is a slidable tongue 76b. The tongue 76b has a thin, flat tongue portion 104 shaped like a segment of film and a connector 106 that joins the tongue portion 104 to a linear mover or linear surrogate drive 78a. The tongue portion 104 can be substantially flexible or substantially rigid.

If substantially flexible, then the tongue portion 104 can be pulled by a linear mover 78a' or can be tensioned independent of the preset member 48 between a pair of linear movers 78a,78a' and can be propelled by a synchronous movement of the two linear movers 78a,78a'. The wind and trip unit 55 includes a backer 86 positioned over the preset member 48 and tongue portion 104. The backer 86 is joined to an arm 112, which moved into the active configuration in the same manner as other subcomponents of the wind and trip unit 55.

The backer 86 retains the tongue portion 104 in the film path 26 by preventing the tongue portion 104 from deflecting away from the film path 26. The tongue 76b can include one or more guides 110 to assist in alignment of the tongue portion 104 during test motion.

In the embodiment of the invention shown in FIGS. 6–7, the backer 86 has a bottom 112 having rounded corners 114; a pair of flattened control areas 116 between the corners 114; and a concave recess 118, to accommodate the preset member 48, located between the control areas 116. In this embodiment, the film path 26 closely adjoins the main body portion 24 and the backer 86 is separated from the main body portion 24 by a dimension equal to or less than twice the thickness of the engagement section 84 of the tongue portion 104.

A substantially rigid tongue portion 104 can be moved in the same manner as a substantially flexible tongue portion or can be pushed by a linear mover 78a. The backer 86 can be provided to prevent even minimal flexing of the tongue portion 104 and to protect against tongue portion deformation, in the event that a defective camera unit 12 causes jams the tongue 76b.

Figure 9:
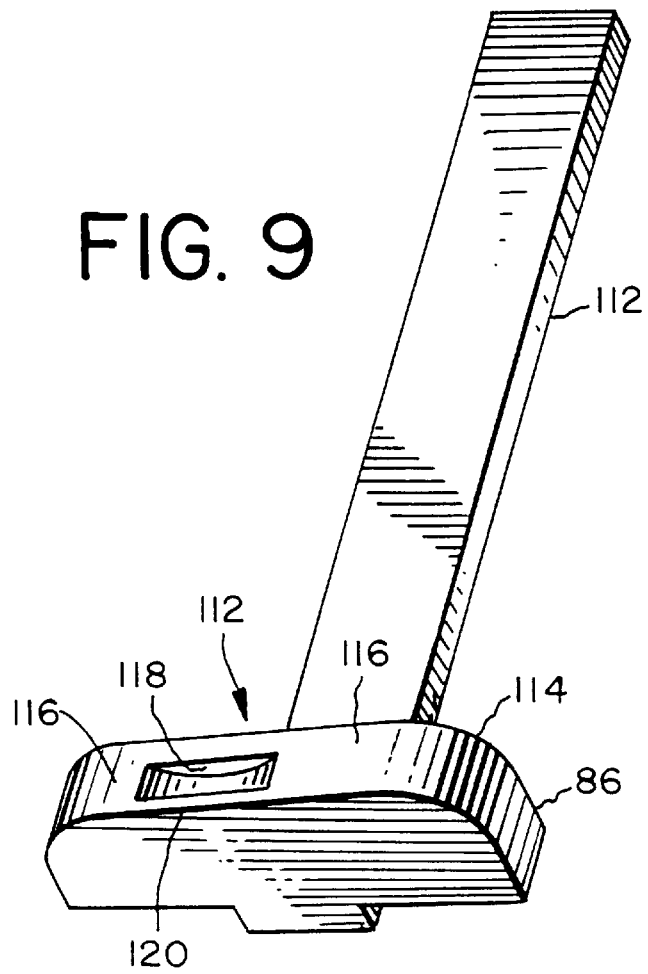
FIG. 9 is a bottom perspective view of the backer of the apparatus of FIG. 8.
Figure 8:
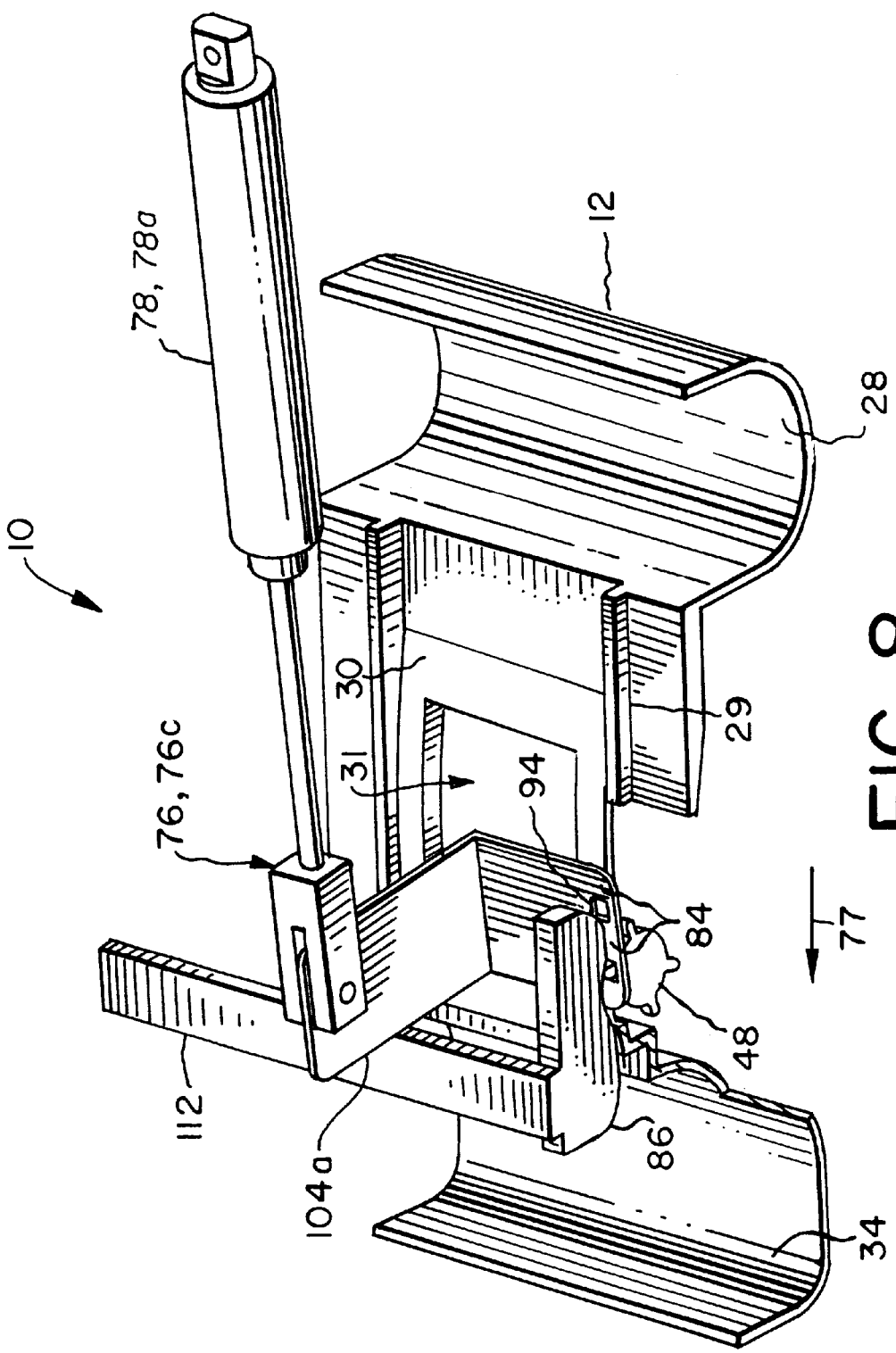
FIG. 8 is the same view as FIG. 6 of still another embodiment of the apparatus of the invention and a camera unit.

Referring now particularly to FIGS. 8–9, in an alternative embodiment of the invention, the film surrogate 76 is a tongue 76c having an L-shaped tongue portion 104a mounted to a linear mover 78a. The tongue portion 104a is substantially rigid and is rigidly or pivotably mounted to the linear mover 78a. A backer 86 overlies the preset member 48 and tongue portion 104a. If the tongue portion 104a is rigidly mounted to the linear mover 78a, then the backer could, optionally, be deleted.

The backer 86 of FIGS. 8–9 differs from backer 86 of FIGS. 6–7, in that the recess 118 is inset from lateral edges 120 of the backer 86. These backers could be interchanged between the different embodiments.

Figure 10:
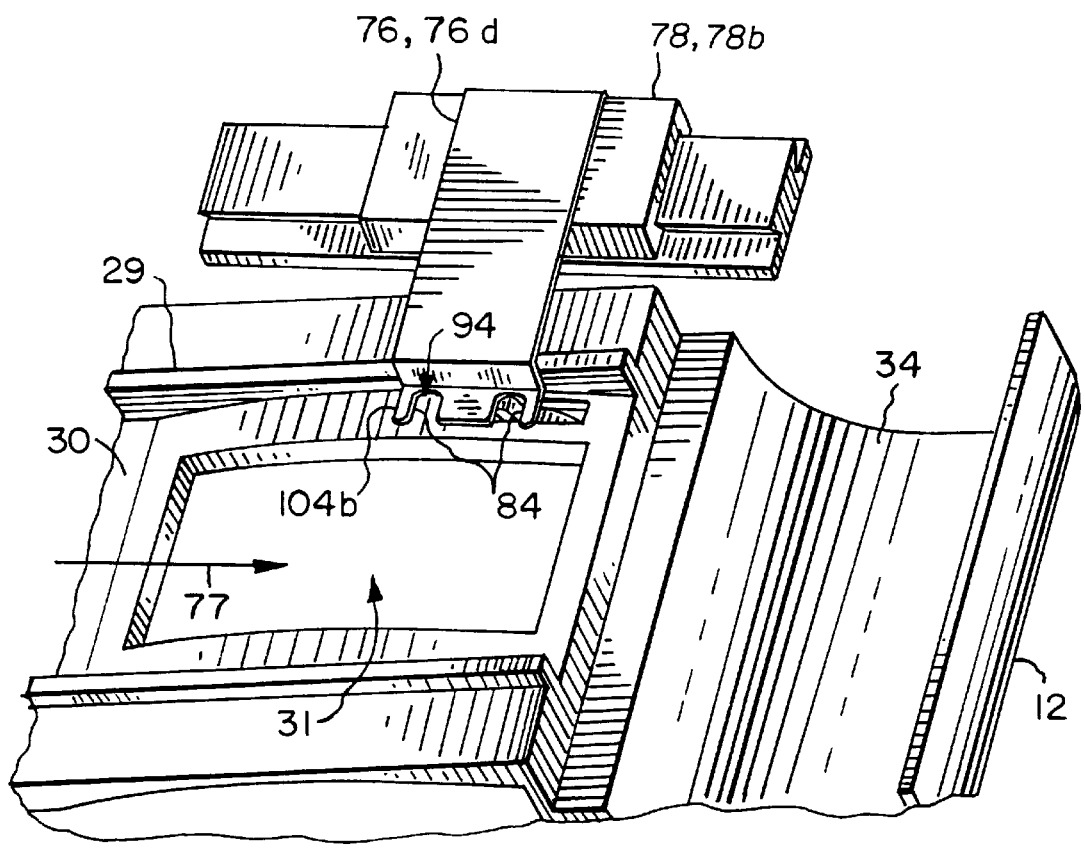
FIG. 10 is a partial perspective view, reversed relative to the perspective of FIG. 8, of still another embodiment of the apparatus of the invention and a camera unit. The film surrogate of the apparatus is in an active conformation. For clarity, the spindle drive and other parts of the apparatus and camera unit are not shown.

Referring now particularly to FIG. 10, in another alternative embodiment of the invention, the film surrogate 76 is a rigid flange 76d that has a stepped shape and is rigidly attached to a linear mover 78b. The flange 76d has a tongue portion 104b that is limited to the engagement section 84 that contacts the preset member 48 and a minimal additional area providing physical support for the engagement section. The tongue 76d of this embodiment has the advantage of relatively small dimensions in directions corresponding to the larger dimensions of the camera unit 12. The tongue 76d has the disadvantage the third dimension of the tongue portion 104b must be relatively thick.

The wind and trip units 55 of the embodiments of FIGS. 6–7, 8–9, and 10 are otherwise like the wind and trip unit of FIGS. 1–3. The different embodiments operate in a similar manner, with the exception that the film surrogates 76c and 76d must be reciprocated back and forth for each wind and trip test, while the belt 76a can be advanced indefinitely, and the tongue 76b can be advanced for a predetermined number of repeats before reciprocating to a starting position.

Figure 12:
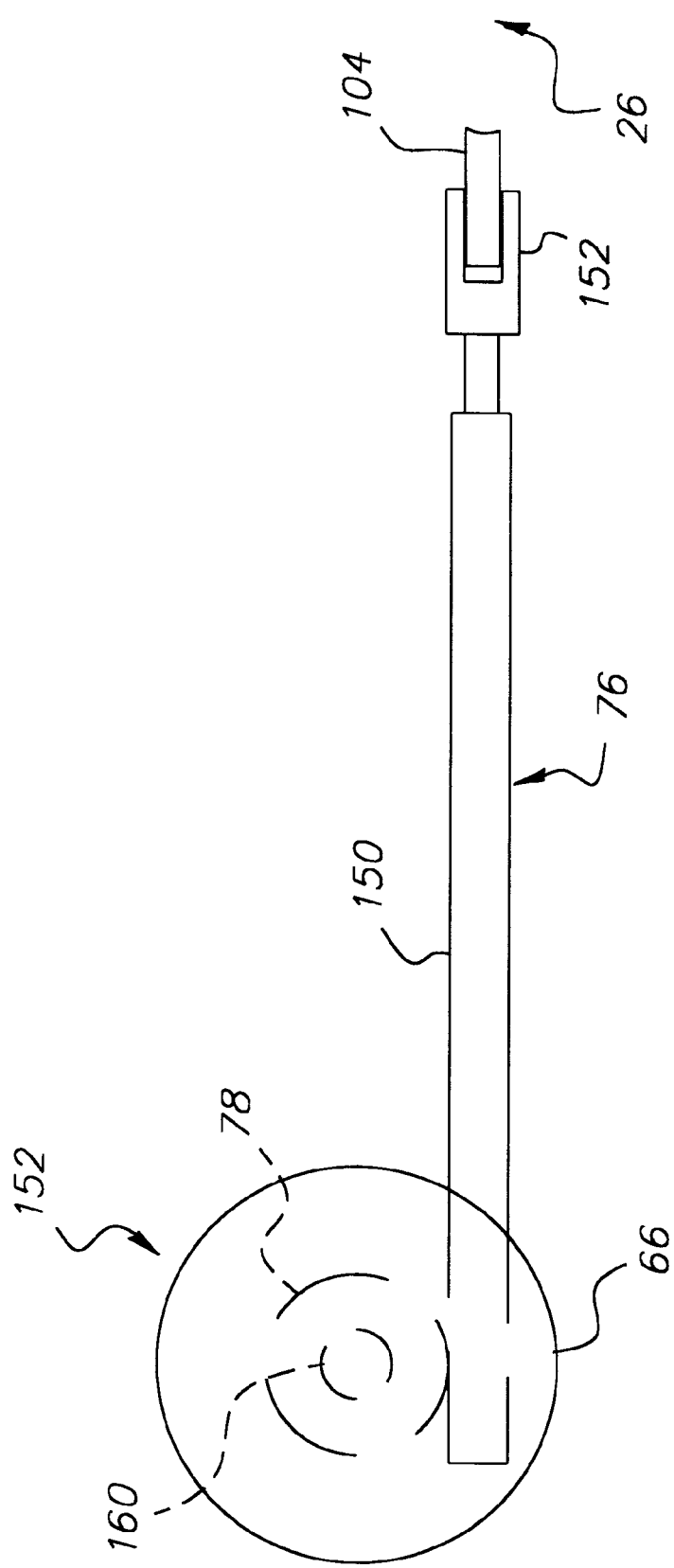
FIG. 12 is a semi-diagrammatical view of the drive train, one of the grip heads, and part of the tongue portion of a modification of the apparatus of FIG. 6. Teeth of the gears and rack are not shown.
Figure 13:
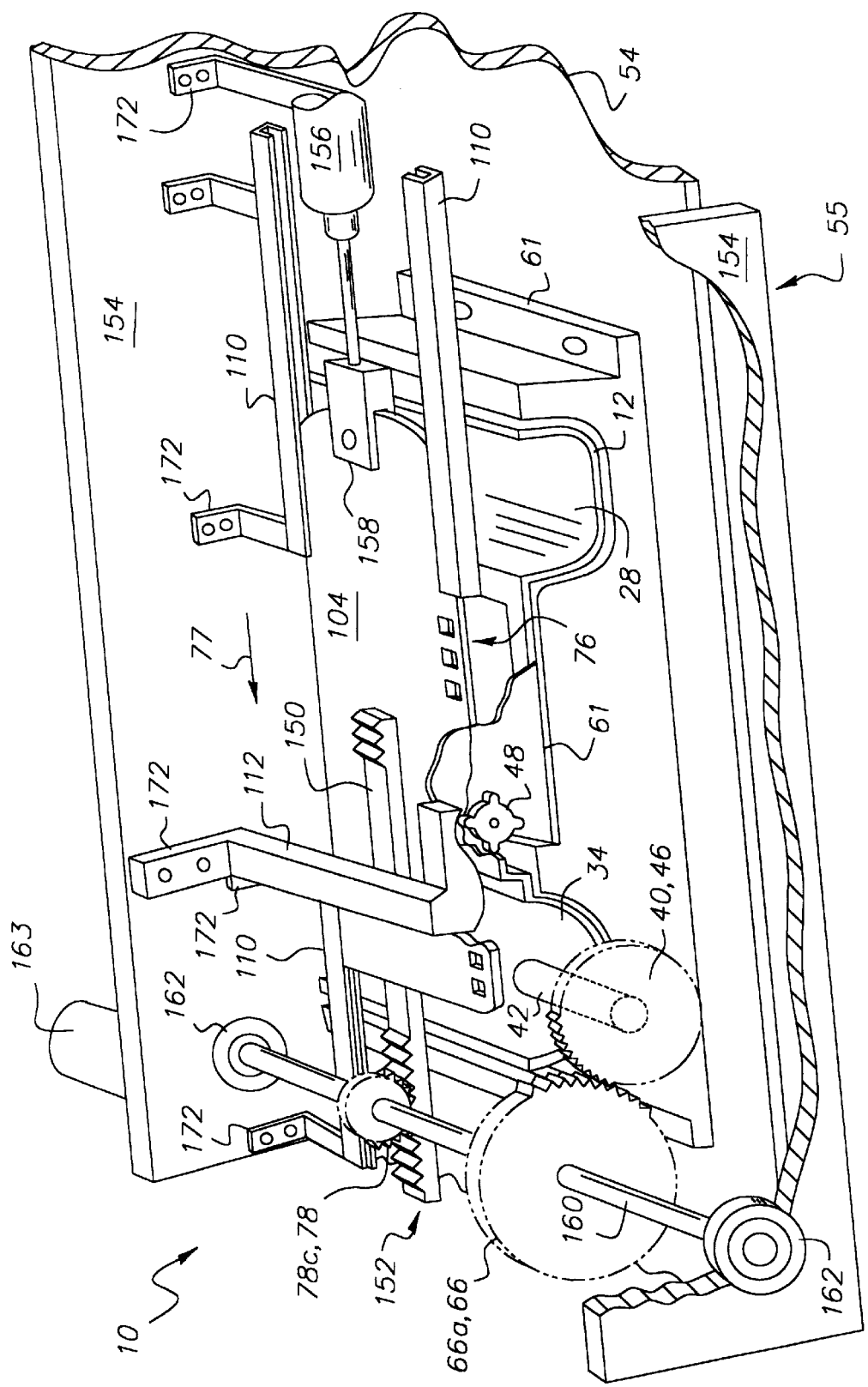
FIG. 13 is a partially cut-away perspective view of another embodiment of the apparatus of the invention and a camera unit. The film surrogate and backer of the apparatus are each in an active conformation. Only some of the teeth of the gears and rack are shown. Additional teeth are indicated by dot-dash lines. For clarity, one of the guides is not shown.
Figure 14:
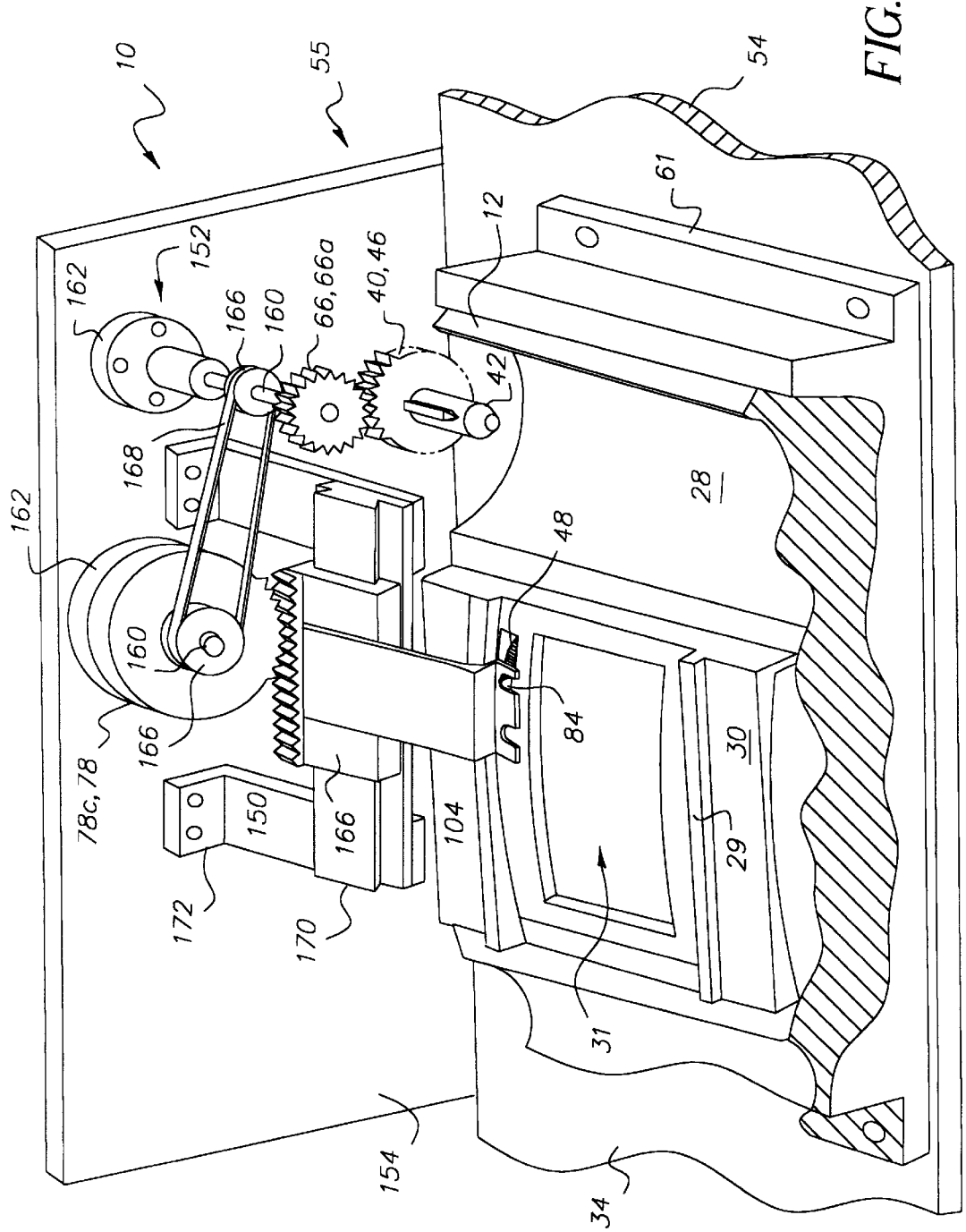
FIG. 14 is a partially cut-away perspective view of another embodiment of the apparatus of the invention and a camera unit. The film surrogate and backer of the apparatus are each in an active conformation. Only some of the teeth of the gears are shown. Additional teeth are indicated by dot-dash lines.

Referring now particularly to FIGS. 12–14, in some embodiments the tongue 76 of the apparatus 10 has a toothed rack 150 that is joined to the tongue portion 104. The rack can be pivotably linked to the tongue portion or the rack 150 can be fixed to the tongue portion 104. In the latter case, the rack 150 is of one-piece with the tongue portion 104 or is securely fastened or attached to the tongue portion 104 such that the fastened part of the rack remains immobile or stationary on the tongue portion 104. The rack 150 can be moderately flexible, but is preferably rigid. The rack 150 is propelled by a surrogate drive 78 of a drive train 152. In the active configuration, the tongue portion 104 is disposed in the film path 26 of the camera unit 12, the surrogate drive 78 is enmeshed with the rack 150, and the spindle drive 66 is in positive engagement with the spindle 40. When the apparatus 10 is actuated, the surrogate drive 78 moves the tongue portion 104 along the film path 26 from a position upstream of the preset member 48 of the camera unit 12 to a position downstream of the preset member 48 and the spindle drive 66 turns the spindle 40. As earlier noted, it is preferred that the propelling of the film surrogate 76 by the surrogate drive 78 and winding of the spindle 40 by the spindle drive 66 are synchronized. The synchronization can be provided, as shown in FIG. 11, by a controller 83 operatively connected to the spindle drive 66 and surrogate drive 78. Synchronization can also be mechanical. For example, in FIG. 13 the spindle drive 66 and surrogate drive 78 are each fixed to a common shaft 160 and in FIG. 14 the spindle drive 66 and surrogate drive 78 are joined by a toothed belt 168. These features are discussed in greater detail below. Except as specifically indicated, the apparatus of FIGS. 12–14 has features like those of the other discussed embodiments.

In the embodiment shown in FIG. 13, the film surrogate 76 has a rigid rack 150 fixed to a flexible tongue portion 104. The tongue portion 104 is retained in the film path 26 by a backer 86. The tongue portion 104 and backer 86 are like those already described in relation to the embodiment of FIGS. 6–7. The tongue portion 104 rides in guides 110 mounted to support members 154, which are positioned adjoining the receiver 54 when the wind and trip unit 55 is in the active configuration. A damper 156, also mounted to a support member 154, has a grip head 158 that is pinned to the tongue portion 104 opposite the rack. The damper 156 resiliently resists the movement of the film surrogate 76 to provide tensioning of the film surrogate 76. (The damper 156 can be eliminated if the tongue portion 104 is made rigid rather than flexible.) The surrogate drive 78 is a rack gear 78c that is meshed with the rack 150. The spindle drive 66 is a spindle gear 66a that is meshed with the teeth of the rotation portion 46 of the spindle 40. In addition to the gears 78c,66a, the drive train 152 also includes a shaft 160 to which the gears 78c,66a are fixed. The shaft 160 is supported by bushings 162 mounted in the support members 154. A motor 163 is joined to one end of the shaft. Since the spindle 40 does not itself move the film surrogate 76, the ratios of the rack and spindle gears 78c,66a is not critical. It is sufficient that the rotation of the spindle 40 is enough to show whether the spindle exhibits excessive resistance to rotation. A convenient rotation of the spindle 40 is at least one-half revolution per advance of the film surrogate from one frame to the next. The drive train 152 can be varied. For example, it is well known in the art that a train of gears can replace an individual gear and that a toothed belt can replace a gear in a train. The film surrogate 76 can also be varied. For example, the apparatus of FIG. 8 could be modified by attaching a rack 150 to the film surrogate 76c and using the drive train shown in FIG. 13.

FIG. 12 illustrates a similar modification of the apparatus of FIG. 6. In the embodiment of the apparatus 10 shown in FIGS. 6, the surrogate drive 78 has a pair of linear movers 78a',78a, each having a grip head 158 that is pinned to a flexible tongue portion 104 of the film surrogate 76. Each grip head 158 is fixed to an impellor 156. (Only one of the impellors 156 is shown. The impellor is a linear motor. The power source for the impellor is not critical. The use of impellors in the form of air cylinders with a compressed air source and air line connecting the compressed air source and air cylinders is well known to those of skill in the art. The use of electrically powered solenoids is likewise well known.) In the embodiment shown in FIG. 12, the apparatus 10 of FIG. 6 is modified by eliminating linear mover 78a' and using the same kind of film surrogate 76, as in the embodiment of FIG. 13. Other features are as shown in FIG. 13. The second linear mover 78a can be retained or can be replaced by a damper (not illustrated in FIG. 12).

Referring now particularly to FIG. 14, in another alternative embodiment of the invention, the film surrogate 76 has a rigid flange 164 and a rack 150 joined to the flange 164. The rack 150 is preferably rigid. The flange 164 or the rack 150, or preferably both the flange 164 and rack 150, are fixed to a slider 166. The slider 166 rides on a track 170. The track 170 and other parts in the various embodiments are held by brackets 172 mounted to the support member or members 154. The flange 164 has a stepped shape and has a tongue portion 104b that is limited to the engagement section 84 that contacts the preset member 48 and a minimal additional area providing physical support for the engagement section. The surrogate drive 78 is a rack gear 78c that is meshed with the rack 150. The spindle drive 66 is a spindle gear 66a that is meshed with the teeth of the rotation portion 46 of the spindle 40. In addition to the gears 78c,66a, the drive train 152 also includes a pair of shafts 160 to which the respective gears 78c,66a are fixed. The shafts 160 are supported by bushings 162 mounted in the support member 154. Also fixed to each shaft 160 is a transmission gear 166. A toothed belt 168 overlays and engages both transmission gears 166. A motor 163 is joined to one end of one of two shafts 160. As earlier mentioned as to another embodiment, the ratios of the rack and spindle gears 78c,66a is not critical and the drive train 152 can be varied.

After testing is completed, the wind and trip unit 55 is moved to an inactive configuration clear of the receiver 54. Since the film surrogate 76 is not curled about the spindle 40 during testing, the wind and trip unit 55 can be moved clear without rewinding or the like. In the various embodiments, the film surrogate 76 is kept from curling about the film spindle 40 by the rigidity and shape of the tongue portion 104 or rack 150, or both; or by the support provided by the linear mover or movers 108. Contact with the spindle 40 is unneeded and could damage the film surrogate 76, thus, it is highly preferred that the film surrogate 76 be kept away from the spindle 40. Contact of the film surrogate 76 with the chambers 28, 34 is also unneeded and could be damaging. This risk is avoided in embodiments of the apparatus 10 shown in FIGS. 6–8, 10, and 12–14, by maintaining the film surrogate 76 external to the chambers 28,34, as shown in those figures.

The invention has been described in detail with particular reference to certain preferred embodiments thereof, but it will be understood that variations and modifications can be effected within the spirit and scope of the invention.

What is claimed is:

1. A method for testing camera units for use with photographic film, each camera unit including a film spindle and having a film driven preset member, each said camera unit defining a film path, the preset member extending into the film path, said method comprising the steps of:

winding the film spindle of the camera unit;

propelling a film surrogate along said film path from a position upstream from the preset member to a position downstream from the preset member; and during said propelling, maintaining said film surrogate in the film path between said position upstream from the preset member and said position downstream from the preset member; and during said propelling, keeping said film surrogate from curling about said film spindle.

2. The method of claim 1 wherein each said camera unit includes a pair of film chambers, said film spindle extending into one of said chambers, said film driven preset member being disposed between said chambers, and said keeping further comprises maintaining said film surrogate external to said chambers.

3. The method of claim 1 further comprising running a drive train having a spindle drive and a surrogate drive, said spindle drive positively engaging said film spindle, said surrogate drive positively engaging said film surrogate.

4. The method of claim 3 wherein said film surrogate and said surrogate drive are enmeshed.

5. The method of claim 1 wherein said running further comprises synchronizing said winding and said propelling.

6. The method of claim 5 wherein said synchronizing is mechanical.

7. The method of claim 1 wherein said film surrogate is planar at said preset member.

8. The method of claim 1 wherein said propelling further comprises moving the preset member from the non-metered position to the metered position with said film surrogate.

9. The method of claim 1 wherein said camera unit has a shutter mechanism, and said propelling further comprises setting said shutter mechanism, and said method further comprises, following said propelling, the step of tripping said shutter mechanism.

10. The method of claim 9 further comprising maintaining the back of the camera unit open during said setting and tripping, loading film in said camera unit prior to said installing, and installing a closure over the back of the camera unit, following said maintaining and loading.

11. The method of claim 1 wherein said propelling further comprises tensioning said film surrogate.

12. The method of claim 1 further comprising registering said camera unit in a testing site, prior to said winding and repeating said registering, winding, propelling, and maintaining steps for other ones of the camera units.

13. An apparatus for testing a photographic film camera unit, the camera unit defines a film path, and has a spindle, and has a preset member extending into the film path, said apparatus comprising:

a receiver accepting the camera unit;

a spindle drive having a cyclically movable drive member, mechanically coupleable to the spindle of said camera unit for rotation of said spindle with cyclic movement of said drive member; and a film surrogate having a tongue portion and a rack joined to said tongue portion, said tongue portion being disposable in the film path of said camera unit; and a surrogate drive enmeshed with said rack, said surrogate drive moving said film surrogate along said film path from a position upstream of the preset member of said camera unit to a position downstream of said preset member.

14. The apparatus of claim 13 wherein said rack is rigid.

15. The apparatus of claim 13 wherein said spindle drive and said surrogate drive are synchronized.

16. The apparatus of claim 15 wherein said synchronizing is mechanical.

17. The apparatus of claim 13 wherein said tongue portion is planar at said preset member.

18. The apparatus of claim 13 wherein said tongue portion is flexible.

19. The apparatus of claim 18 further comprising a backer disposable over said preset member and said tongue portion, said backer retaining said tongue portion in said film path during said movement of said film surrogate from said upstream position to said downstream position.

20. The apparatus of claim 13 wherein said film surrogate is rigid.

* * * * *